June 21, 1927.
S. K. BILBO
1,633,514
FAN SUPPORT
Filed June 19, 1925
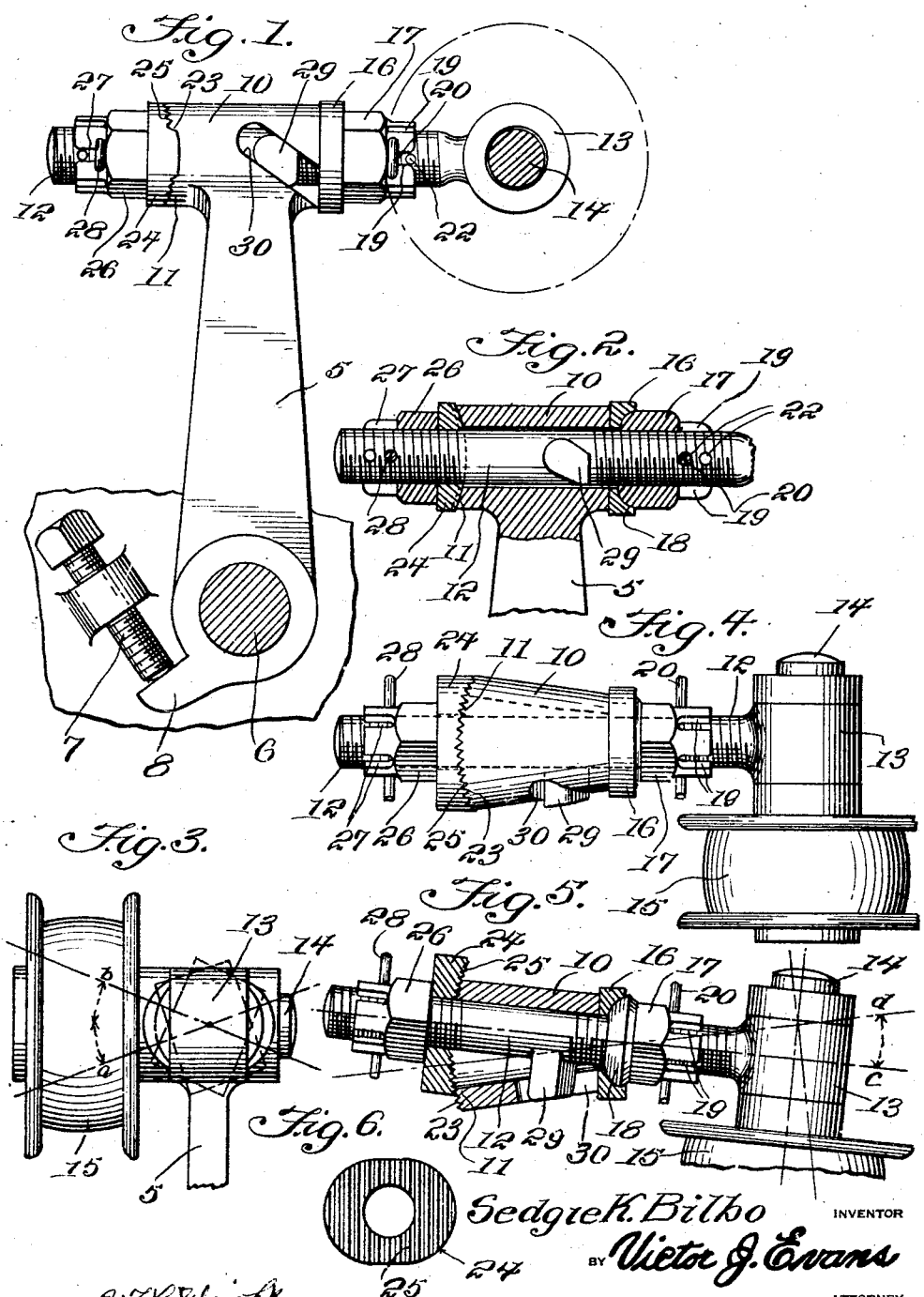
Sedgiek. Bilbo INVENTOR Patented June 21, 1927.

1,633,514

UNITED STATES PATENT OFFICE.

SEDGIE KIAH BILBO, OF TYLERTOWN, MISSISSIPPI.

FAN SUPPORT.

Application filed June 19, 1925. Serial No. 38,376.

This invention relates to fan supports for internal combustion engines and its principal object is to provide a support which can be adjusted to permit the fan drive belt to run truly at all times.

A further object of the invention is to provide a fan support which can be readily adjusted to permit the belt to run truly both upon the crank shaft pulley and upon the fan pulley.

With the preceding and other objects and advantages in view, the invention consists in the novel combination of elements, arrangement of parts and operations, to be hereinafter specifically referred to, illustrated in the accompanying drawings and pointed out in the appended claim.

In the drawings:

Figure 1 is a side elevation of the fan support constucted in accordance with my invention.

Figure 2 is a longitudinal sectional view of the same.

Figure 3 is a top plan view showing the various adjustments of the device, and

Figure 4 is a plan view of the device in normal position and,

Figure 5 is a view partly in section and partly in elevation showing the adjusting means for the device.

Figure 6 is a detail view of the adjusting plate.

It has been found from experience that the bearings of the usual fan belt pulley support becomes worn and thereby causes the arm to become strained and of course tends to cause the belt to run off the pulley. It is the aim of the present invention to provide a wear compensating device which will permit the belt to run in a true position at all times.

Referring to the drawings in detail wherein corresponding characters of reference denote corresponding parts throughout the several views, the numeral 5 designates a vertically arranged arm adjustable axially about the pin 6, the usual adjusting screw 7 being provided for coaction with a lug 8 at the lower end of the arm for accomplishing this axial adjustment. As shown in Figure 2 the upper end of the arm 5 is formed with a horizontally extending sleeve or bearing 10 having one end substantially convex as at 11. A threaded rod 12 extends through this sleeve or bearing 10 and terminates at one end in a bearing 13 which extends at right angles to the bearing or sleeve 10. A pulley shaft 14 is journaled in this bearing and carries the usual pulley 15 with which the usual band belt is engaged. Arranged on the threaded rod 12 adjacent one end thereof is a cup shaped washer 16 while a nut 17 is threaded on this end of the rod and is formed with a surface 18 received in the concaved washer 16. This nut 17 is provided with a pair of slots 19 through which a locking pin 20 is passed, the latter passing through openings 22 in the rod.

As shown in Figures 4 and 5, the opposite end of the bearing or sleeve 10 is flared and is provided with teeth or serrations 23. An adjusting plate 24 is received on this end of the rod and is shaped to correspond to the flared end of the sleeve or bearing 10 and is also provided with serrations 25 for engagement with the serrations 23. A lock nut 26 is arranged on this end of the rod and is provided with the slot 27 for the reception of the locking key or pin 28.

Extending laterally from the rod 12 intermediate its ends is a pin or lug 29 which is accommodated in a diagonal slot 30 in the sleeve or bearing pin.

When it is desired to adjust the device the nuts 17 or 26 are loosened and the rod 12 slid longitudinally to the desired position. In order to compensate for wear of the bore of the sleeve or bearing 10, the locking plate 24 is disengaged from the flared end of the sleeve and the sleeve is then arranged in the correct position and then locked by means of the plate and lock nut 26. It will also be obvious that in adjusting the rod 12 longitudinally the same will be adjusted gradually to position the bearing 12 in alinement with the belt, not shown.

While I have shown and described the preferred embodiment of the invention, I desire to have it understood that such changes may be made in the form, construction and arrangement of parts and operations, as will not depart from the spirit of the invention or the scope of the subjoined claim.

What is claimed is:

A device of the character described comprising an arm, a bearing carried thereby and provided with a slot, a rod passing through the bearing and having its opposite ends threaded, a lug on the rod and engaged in the slot, means for supporting a pulley at one end of the rod, one end of the bearing being flared and provided with serrations, a locking plate on the rod and also having serrations and engageable with the first mentioned serrations and lock nuts on the opposite ends of the rod and one of which is engageable with the serrated locking member and adapted to lock the bearing in lateral or adjusted position.

In testimony whereof I affix my signature.

SEDGIE KIAH BILBO.